Sept. 13, 1932.  V. G. APPLE  1,876,540
SERVO BRAKE MECHANISM FOR VEHICLES
Filed Jan. 30, 1929   3 Sheets-Sheet 1
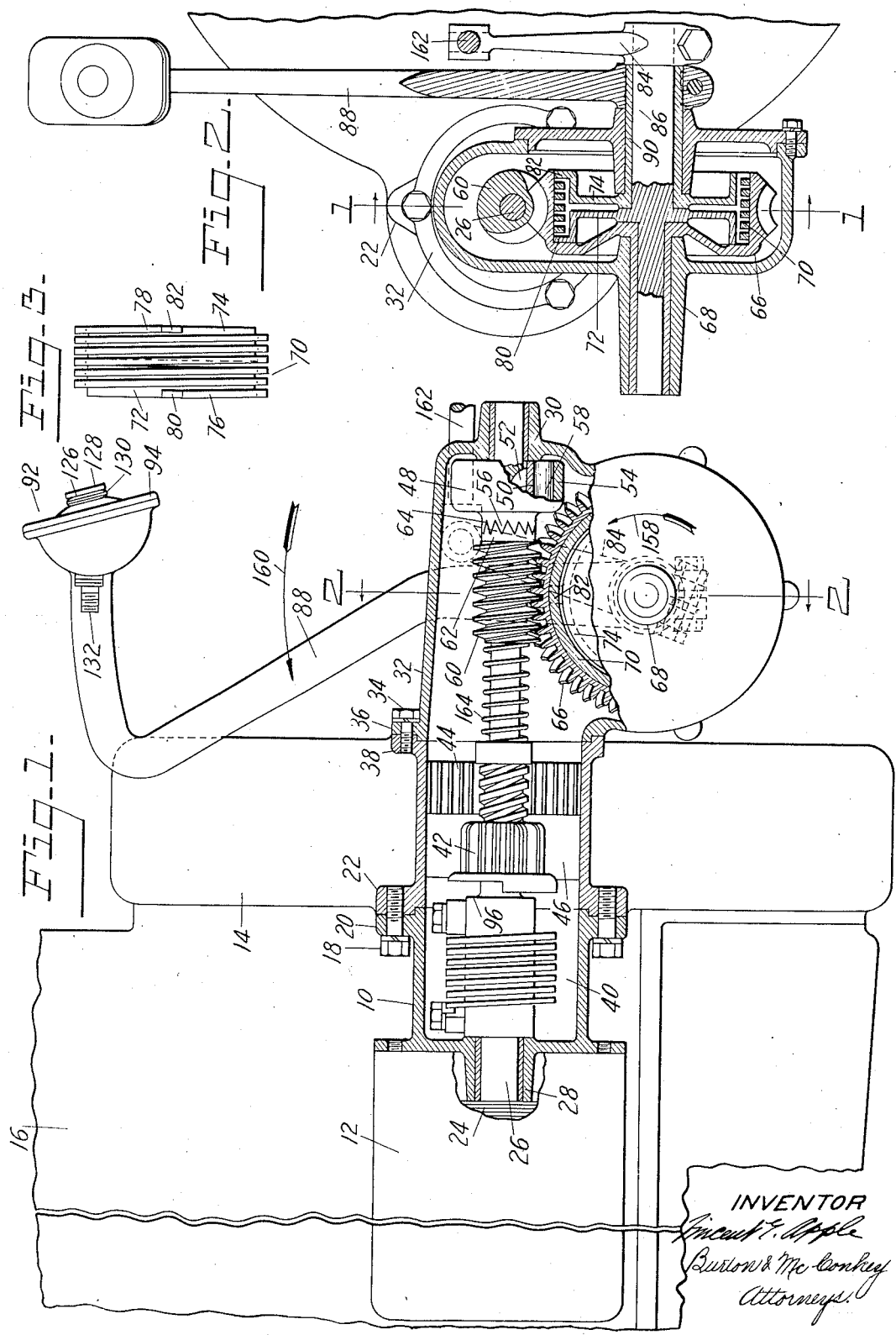
INVENTOR

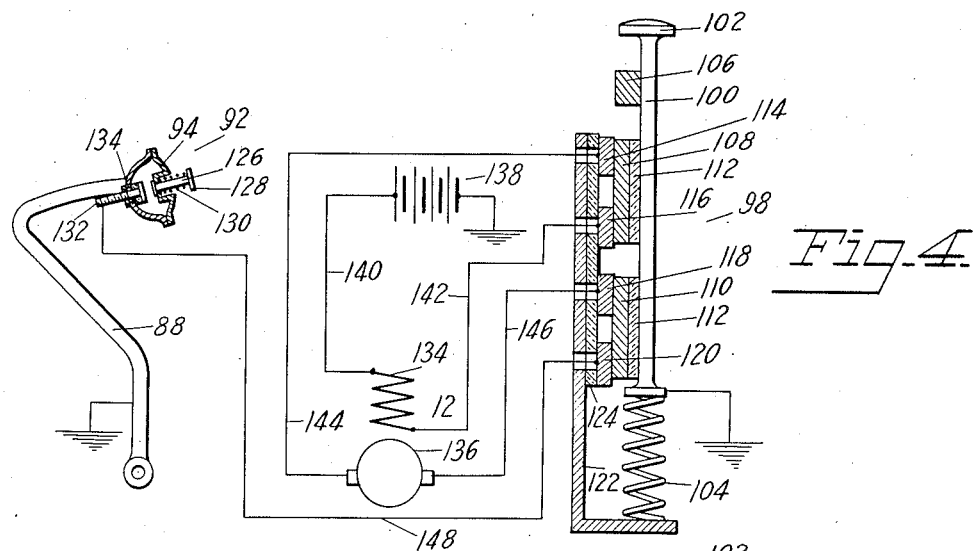
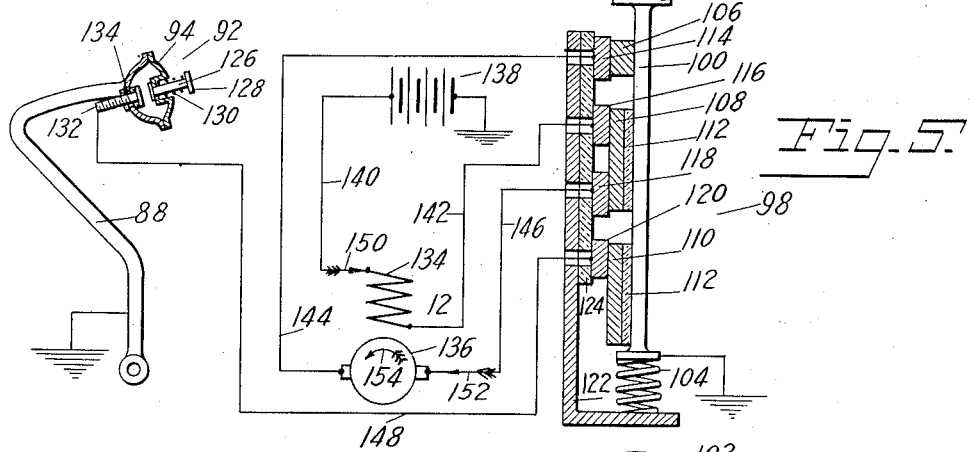
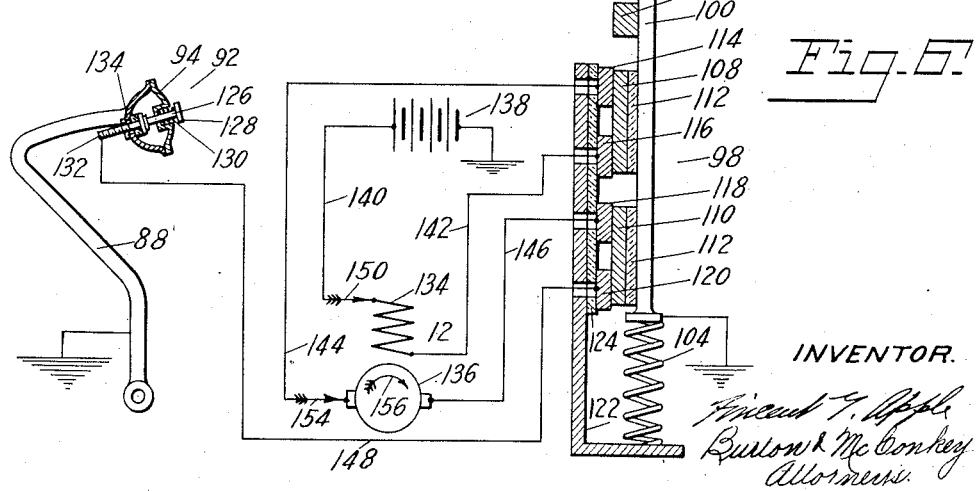

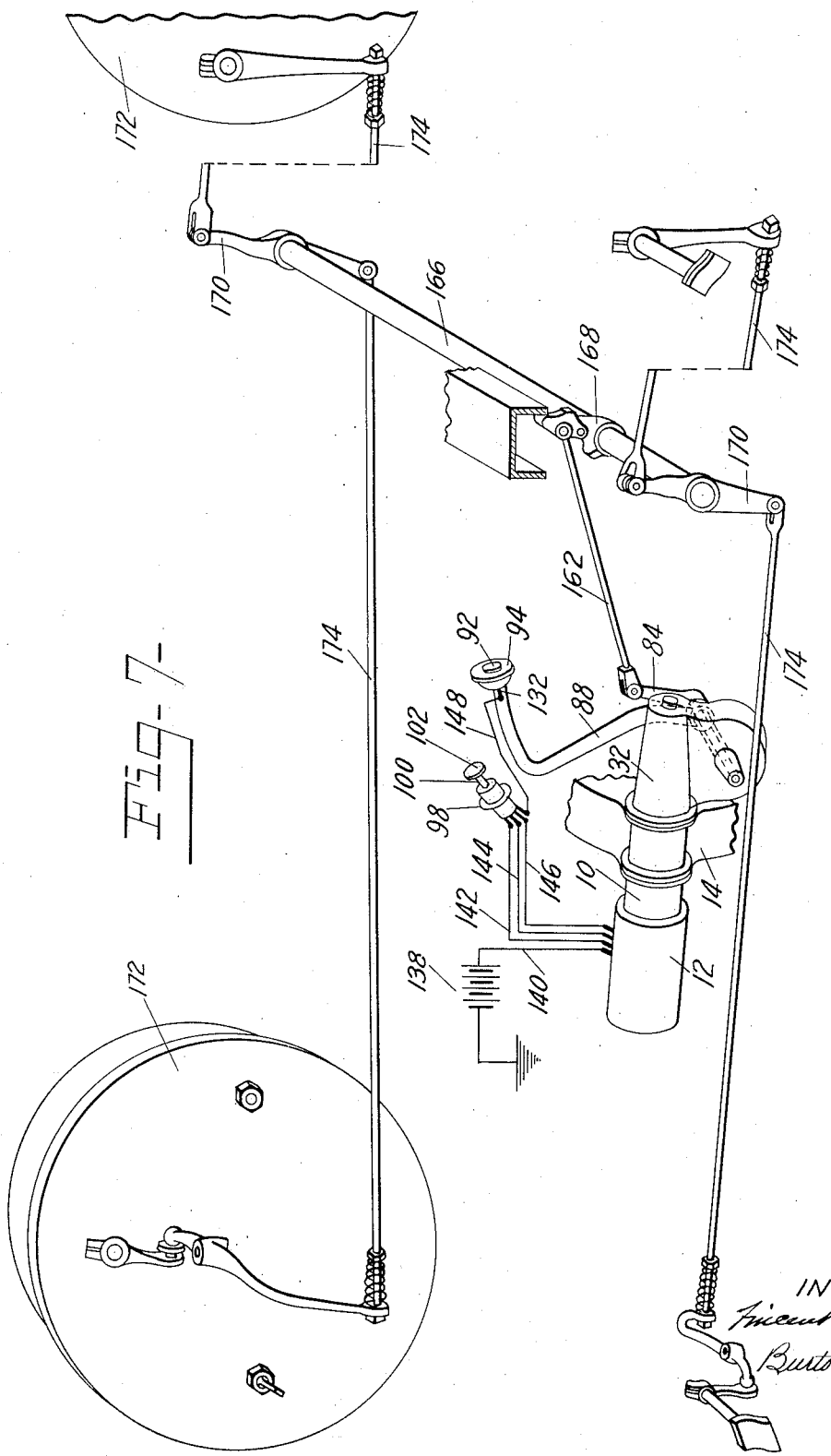

Patented Sept. 13, 1932

1,876,540

UNITED STATES PATENT OFFICE

VINCENT G. APPLE, OF DAYTON, OHIO, ASSIGNOR TO BENDIX BRAKE COMPANY, OF SOUTH BEND, INDIANA, A CORPORATION OF ILLINOIS

SERVO BRAKE MECHANISM FOR VEHICLES

Application filed January 30, 1929. Serial No. 336,298.

This invention relates to mechanism particularly adapted to automotive use wherein electric starting apparatus is combined with electric servo braking apparatus.

An object of the invention is to combine the starting and the braking systems so as to employ power from the same motor to start the engine and to apply the brakes.

More particularly an object of the invention is the provision of means whereby the starting motor may be employed in the conventional manner to start the engine without affecting the brakes, and the brakes may be applied by the driver through the employment of the conventional brake pedal or other suitable manually operable applying member which is connected with the brakes in such a manner as to couple the starting motor with the brakes to exert brake-applying pressure thereon upon initial brake-applying movement of the pedal, yet the arrangement is such that the brakes may be applied manually through the use of the pedal independently of the starting motor or in the event the starting motor is inoperative.

Another object resides in the provision in combination with an oppositely operative starting motor of mechanism cooperating with the motor shaft to couple the shaft, when running in one direction, with the engine to start the engine; and when running in the opposite direction, with the brakes to exert brake-applying force thereupon.

An important feature consists in providing suitable clutch mechanism responsive to the initial engagement of the brake pedal by the operator to apply the brakes to bring the starting motor into play and responsive to the initial brake applying movement of the pedal to couple the starting motor mechanically with the brakes to exert brake-applying force thereupon and, specifically, clutch mechanism is provided which is overrunning in one direction of rotation of the starting motor shaft to permit rotation thereof to start the engine without affecting the brake operating mechanism while in the reverse direction of shaft rotation it is adapted to pick up the shaft.

Clutch mechanism is also provided responsive to movement of the brake pedal in applying the brakes to couple the starting motor shaft with the brakes, which clutch mechanism is also operable to effect a connection between the pedal and the brakes to apply the brakes mechanically independent of the starting motor.

I attain these objects by novel principles embodied in the mechanism hereinafter described and shown in the drawings wherein—

Fig. 1 is a longitudinal vertical axial section through the embodiment selected to illustrate the invention. The section is taken at 1—1 of Fig. 2.

Fig. 2 is a transverse section taken at 2—2 of Fig. 1.

Fig. 3 is a detail view of one of the principal parts of the mechanism.

Fig. 4 is a schematic illustration of the electric circuit and the controls. The controls are in position to render the system inoperative.

Fig. 5 is a similar illustration of the same elements except that the controls are in position for starting.

Fig. 6 shows the controls positioned to operate the brakes.

Fig. 7 shows a complete automotive braking system employing my improved apparatus.

Similar numerals refer to similar parts throughout the several views.

In the drawings the bracket 10 carrying the starting motor 12 is secured to flywheel housing 14 of engine 16 by screws 18 passing through ears 20 into ears 22.

The armature 24 is mounted in overhung fashion on an extending end of shaft 26 and has rotative bearing adjacent the armature in hub 28 of bracket 10 and at the other end in hub 30 of gear housing 32 which is secured to the flywheel housing 14 by bolts 34 passing through ears 36 into ears 38. As there is no bearing at the outer end of the armature, near the commutator, trouble from oil getting on the commutator and brushes is averted.

A Bendix starter drive 40 is secured in the usual manner to shaft 26, its pinion 42 being adapted to engage gear 44 on engine flywheel 46 upon suitable rotation of the pinion, and to be disengaged therefrom when gear 44 becomes the driver, all as in standard practice.

On shaft 26 adjacent hub 30 is an overrunning roller clutch 48. This roller clutch is of a convenient design and comprises an inner member 50 secured to the shaft by key 52, an outer member 54 having a hub 56 rotatively supported on the shaft, and rollers 58 adopted to join the two members for simultaneous rotation when the shaft revolves in one direction, and to permit the two members to be free from each other when the shaft revolves in the other direction.

Adjacent the roller clutch 48 on shaft 26 is the worm 60. The worm hub 62 and the roller clutch hub 56 have corresponding teeth 64 whereby one of said hubs may be rotatively driven by the other. The worm wheel 66 has its rotative bearing in the hub 68 of gear housing 32.

To obtain brake applying energy from the rotating worm wheel 66, a coil spring clutch is employed. This clutch comprises a rectangular wire coil spring 70 which is normally free to revolve in the bore of worm wheel 66 but which may be expanded to fit the bore tightly upon relative rotative movement of flanged members 72 and 74.

The ends of coil spring 70 are cut off squarely as at 76 and 78 (see Fig. 3), and a lug 80 extending upwardly from flanged member 72 engages the end 76 while another lug 82 extending upwardly from flanged member 74 engages the end 78. Flanged member 72 is joined to brake operating arm 84 by shaft 86, while flanged member 74 is joined to pedal 88 by tube 90. Pedal 88 has an electric switch 92 built into the tread 94. This switch is operative to close whenever the pedal is depressed.

In order to enable the motor 12 to operate the Bendix drive in starting, and afterward to operate the worm wheel 66 for braking, without interference of one operation with the other, provision is made to revolve the motor shaft in opposite directions, whereby the starting pinion 42 is moved axially into engagement with flywheel gear 44 in the usual manner for starting, but is urged toward shoulder 96 when the motor revolves in the other direction for braking. The camming surfaces of hub 50 of clutch 48 are so cut that while the motor 12 runs in the starting direction the member 54, and in consequence the worm 60 and wheel 66 are stationary, but when the motor runs oppositely to its starting direction the wheel 66 is revolved so that braking energy may be taken therefrom.

In order to have the motor 12 revolve in one direction when starting and in the other direction only when pedal 88 is depressed for braking, appropriate circuit controls are required, and to meet this requirement the circuit and controls schematically shown in Figs. 4, 5 and 6 are provided, Fig. 4 showing the position of the controls when neither starting nor braking is taking place, Fig. 5 when starting only is taking place, and Fig. 6 when braking only is taking place.

To make the system operative without more effort or attention than would be required where two separate motors were employed, the starting switch is so constructed and arranged that downward pressure thereon makes all necessary connections to revolve the motor in proper starting direction, while its release to normal position, without more, makes such connections as will revolve the motor oppositely whenever the pedal operable switch 92 is made to act in conjunction therewith.

Referring to Figs. 4, 5 and 6 the starting switch 98 has a stem 100 adapted to be downwardly depressed by the application of foot pressure to tread 102 and to be returned by the upward pressure of spring 104. A short contact member 106 is secured to and in electrical contact with stem 100. Two longer contact members 108 and 110 are secured to and electrically insulated from the stem by pads 112 of insulating material. Contacts 114, 116, 118 and 120 are secured to the switch frame 122 and are insulated from each other and from the frame by insulating strip 124.

The switch 92 which is built into tread 94 of brake pedal 88 is required to act in conjunction with switch 98 only when braking is to be effected. Switch 92 comprises a grounded stem 126 inwardly depressible by head 128 and returnable by spring 130, and an insulated contact 132 supported in pedal 88 and insulated therefrom by insulating bushing 134.

Figs. 4, 5 and 6 show the motor 12 diagrammatically, 134 being the field coil and 136 the armature. A battery 138 supplies the electric current. One terminal of the battery is grounded, while the other is connected by wire 140 to one end of the field winding 134. The other end of the field winding is connected by wire 142 to terminal 116. Wires 144 and 146 connect armature 136 to terminals 114 and 118 respectively and an additional wire 148 connects terminal 132 of brake pedal switch 92 to terminal 120 of starting switch 98. The stems 100 and 126 of the two switches are grounded.

Fig. 4 shows the stems 100 and 126 of the two switches in the inoperative position. By inspection it may be seen that no circuit is made and consequently no current will flow with the switches in this position.

Fig. 5 shows tread 102 of starting switch 98 depressed to the starting position. By tracing the circuit it may be seen that current may flow from battery 138 thru field 134 in the direction of arrow 150 and through the armature in the direction of the arrow 152. The motor then turns in the direction of arrow 154 which is the proper direction for starting the engine. No current flows in wire 148 nor would current flow therein even if pedal switch 92 were at this time closed.

In Fig. 6 the starting switch 98 is returned to its normal inoperative position and stem 126 of pedal switch 92 is depressed, and insulated terminal 132 is thereby connected to the ground. In this position current passes from battery 138 through field coil 134 in the direction of arrow 150 just as in Fig. 5 but through the armature in the direction of arrow 154 which is opposite to the direction taken through the armature in Fig. 5. The motor now revolves in the direction of the arrow 156 which is opposite to its starting direction.

The system operates as follows:

The starting switch 98 is depressed to the position Fig. 5. The motor revolves counter clockwise viewed from the commutator end. Pinion 42 is screwed into gear 44 and the engine is cranked until started, whereupon the pinion is thrown out of mesh with the gear. Starting switch 98 is returned to normal as in Fig. 4 or 6. As long as the starting switch remains in this normal inoperative position the pedal switch 92 may be depressed to assist in applying the brakes.

When pedal switch 94 is depressed as in Fig. 6 the motor revolves clockwise and pinion 42 is urged toward shoulder 96. Rollers 58 of clutch 48 now wedge against hub 50 and are thereby pressed outwardly against ring 54 whereby hub 56 is revolved with the motor shaft 26.

Through teeth 64 on hub 62 the worm 60 is revolved, the worm in turn revolving gear 66. The angle of the worm teeth is such that the wheel is turned in the direction of arrow 158 and the worm urged toward hub 56 so that teeth 64 are kept in engagement as long as the worm is driving the wheel.

If now pressure on switch 92 is further increased the effect will be to move pedal 88 in the direction of the arrow 160 (see Fig. 1) whereupon lug 82 of flanged member 74 presses against end 78 of spring 70, and, since the other end 76 is resisted by lug 80, the spring expands, whereby spring 70, lugs 80 and 82, flanged members 72 and 74 and pedal 88 and brake arm 84 are all simultaneously urged in the direction of arrow 160, the effort of the motor being added to the effort of the operator to put brake rod 162 in tension.

Because of the fact that worm gearing of such high reduction is not readily reversible, provision is preferably made to permit wheel 66 to be revolved by clutch spring 70 without revolving worm 60 at such times as current to revolve it may accidently be lacking, for otherwise the operator's effort on pedal 88 would not transfer to brake rod 162 and the mechanism would be inoperative to apply the brakes either mechanically or electrically whenever worm 60 could not be revolved by the motor.

To obviate this difficulty the spring 164 is provided, and when the electric current fails, the application of pressure to pedal 88 expands the clutch spring 70 and rotates it and wheel 66 forward thereby moving worm 60 axially, without revolving it, against the yielding resistance of spring 164, whereby the brakes are mechanically applied regardless of the failure of the electric power.

Fig. 7 shows my improved apparatus operatively connected to automotive four wheel brake linkage of well known design. Tension in rod 162 moves it forward thereby giving partial rotation to shaft 166 thru arm 168, whereby arms 170 operate thru brakes 172 thru rods 174 in the usual manner.

What I claim is:

1. Automotive mechanism comprising, in combination, an internal combustion engine, a motor, brakes, means operable to couple the motor with the engine to start the engine, a brake operating shaft, gearing adapted to operatively connect the motor to said brake operating shaft, a brake operating pedal, and a clutch responsive to brake applying movement of said pedal to operatively couple the motor with said shaft through said gearing.

2. Automotive mechanism comprising, in combination, an internal combustion engine, a motor having a shaft, brakes, means operable to couple the shaft of said motor with the engine to start the engine, a gear adapted to be driven by the motor shaft, a brake pedal, and clutch mechanism responsive to brake movement of the pedal to operatively connect said gear to said brake.

3. Automotive mechanism comprising, in combination, an internal combustion engine, a reversible motor, a brake applying member, means responsive to motor rotation in the one direction to couple the motor and engine to start the engine and means responsive to motor rotation in the other direction to couple the motor with the brake-applying member.

4. Automotive mechanism comprising, in combination, an internal combustion engine, a reversible motor, means responsive to motor rotation in one direction to engage and start the engine, brakes, brake applying mechanism, gearing adapted to couple the motor with the brake applying mechanism, and an overrunning clutch responsive to motor rotation in the direction opposite to starting to actuate said gearing.

5. Automotive mechanism comprising, in combination, an internal combustion engine, a motor having a shaft, a brake-applying shaft, means to rotate the motor oppositely, means responsive to motor rotation in one direction to engage and start the engine, a worm on the motor shaft, a worm wheel meshing with said worm and operatively coupled with the brake-applying shaft, and an overrunning clutch adapted to connect said motor shaft with the worm to rotate the worm only when the motor shaft revolves oppositely to starting direction.

6. Automotive mechanism comprising, in combination, an internal combustion engine, a motor having a shaft, a braking shaft, means to rotate the motor shaft oppositely, means automatically responsive to motor shaft rotation in one direction to engage and start the engine, gearing operable to couple the motor shaft with the braking shaft, an overrunning clutch operable to couple the motor shaft with the braking shaft through said gearing only when the motor shaft rotates in the opposite to starting direction, and manually controllable means adapted to connect the braking shaft gear to the braking shaft to urge said braking shaft in brake applying direction.

7. Automotive braking mechanism comprising, in combination, a motor, a braking shaft, a gear on said motor shaft, a mating gear free to revolve on said braking shaft, and a manually operable tubular member surrounding said braking shaft and having lost motion connection therewith for operation thereof, said lost motion connection being operative also to bring said mating gear and said braking shaft into driving engagement.

8. Automotive braking mechanism comprising, in combination, a motor, a braking shaft, a worm on the motor shaft, a mating worm wheel adapted to be coupled with the braking shaft, and a pedal operable tube surrounding the braking shaft and being operatively connected therewith by yielding means adapted to frictionally couple the worm wheel therewith after yielding a predetermined amount.

9. Automotive braking mechanism comprising, in combination, a braking shaft, a worm wheel adapted to be connected with the braking shaft, a worm to revolve the wheel, power connections to said worm whereby said wheel is revolved, and manual means operative to engage said wheel to manually assist the power means and to connect the wheel with the braking shaft.

10. Automotive braking mechanism comprising, in combination, a braking shaft, a worm wheel adapted to be connected with said braking shaft, a worm meshing with said wheel, power means to revolve the worm thereby to revolve the wheel, manual means to revolve the wheel, said worm adapted to move out of driving couple with the wheel when the wheel is manually revolved without power operation of the worm.

11. Motor vehicle starting and braking mechanism comprising, in combination, an internal combustion engine, brakes, a brake operating shaft, an oppositely rotatable starting motor having a shaft, a member axially movable over the starting motor shaft when the shaft is rotating in one direction to couple the shaft with the engine to start the engine, and means operable to couple the starting motor shaft with the brake operating shaft including a member axially movable over the starting motor shaft to disconnect the same from the brake operating shaft.

12. Motor vehicle starting and braking mechanism comprising, in combination, an internal combustion engine, brakes, a brake operating shaft, an oppositely rotatable starting motor having a shaft, two separate gear members independently axially slidable over the starting motor shaft, one of said gear members adapted to couple the starting motor shaft with the engine to start the engine and the other gear member adapted to couple the starting motor shaft with the brake operating shaft to rotate the same to apply the brakes.

13. Motor vehicle starting and braking mechanism comprising, in combination, an internal combustion engine, brakes, a brake operating shaft, an oppositely rotatable starting motor having a shaft, gearing adapted to couple the starting motor with the engine to start the engine including mating gears one of which is axially slidably mounted upon said starting motor shaft for movement thereover into and out of engagement with its mating gear, gearing adapted to couple the starting motor with the brake operating shaft to apply the brakes including mating gear members one of which is axially slidably mounted upon the starting motor shaft for movement thereover into and out of engagement with its mating gear.

14. Motor vehicle starting and braking mechanism comprising, in combination, an internal combustion engine, brakes, a starting motor, means operable to couple the starting motor with the engine to start the engine and means adapted to connect the starting motor with the brakes to apply the brakes including a manually operable brake applying member adapted upon its initial brake-applying movement to make such connection.

15. Motor vehicle starting and braking mechanism comprising, in combination, an internal combustion engine, brakes, a starting motor, a source of power supply for the starting motor, means adapted to couple the starting motor with the brakes to exert a power impulse of application thereon including a brake pedal connected with the brakes to apply the brakes independently of the starting motor and electric control means carried by the brake pedal and adapted upon brake-applying engagement of such pedal to connect the starting motor with the source of power supply.

16. Motor vehicle starting and braking mechanism comprising, in combination, an internal combustion engine, brakes, a starting motor, a source of power supply for the starting motor, means adapted to couple the starting motor with the brakes to exert a power impulse of application thereon including a brake pedal connected with the brakes to apply the brakes independently of the starting motor and electric control means carried by the brake pedal and adapted upon brake-applying engagement of such pedal to connect the starting motor with the source of power supply and adapted upon initial brake applying movement of the pedal to couple the starting motor with the brakes to apply the brakes.

17. Automotive mechanism comprising, in combination, an internal combustion engine, a motor having a shaft, means operable to couple the motor shaft with the engine to start the engine, brake-applying mechanism, a worm on the motor shaft, means operable to couple said worm with the brake-applying mechanism to exert brake-applying effort thereon.

18. Automotive mechanism comprising, in combination, an internal combustion engine, a motor having a shaft, means operable to couple the motor shaft with the engine to start the engine, brake-applying mechanism, a worm on the motor shaft, means operable to couple said worm with the brake-applying mechanism to exert brake-applying effort thereon and a clutch controlling the driving connection of said worm with the brake-applying mechanism.

19. Automotive mechanism comprising, in combination, an internal combustion engine, a motor, brakes, means dependent on the direction of rotation of the motor for connecting the motor with either the engine or the brakes, and means for selectively causing rotation of the motor in either direction.

20. Automotive mechanism comprising, in combination, an internal combustion engine, a motor, a brake applying shaft, means to rotate the motor in opposite directions, gearing responsive to motor rotation in the one direction to connect the motor and the engine shafts and other gearing responsive to motor rotation in the other direction to connect the motor and the brake applying shafts.

21. Automotive mechanism comprising, in combination, an engine, a starting motor having a shaft, brakes, two members mounted on the shaft and slidable axially thereover and each adapted to receive an impulse of rotation therefrom, one member adapted to couple the shaft with the engine to impart an impulse of rotation thereto and the other member adapted to couple the shaft to the brakes to exert brake-applying effort thereon.

22. Automotive mechanism comprising, in combination, an engine, a starting motor having a shaft, brakes, a starting pinion slidable over the shaft to couple the shaft with the engine, said shaft having an extension projecting beyond said pinion, means operable to couple said extension with the brakes to exert brake-applying effort thereon upon rotation of the shaft.

23. Automotive mechanism comprising, in combination, an engine having a fly wheel, brakes, a starting motor having a shaft, a pinion on the shaft positioned on one side of the fly wheel and operable to couple the shaft with the fly wheel to rotate the fly wheel, and means coupling the shaft on the opposite side of the fly wheel with brakes to exert brake-applying effort thereon.

24. Automotive mechanism comprising, in combination, an engine, an electric starting motor, brakes, an electric circuit including said motor and a source of electric power and one switch operable to make the circuit through the motor in one direction and another switch operable to make the circuit through the motor in the opposite direction, means operable to couple the motor when rotating in one direction with the engine to start the engine and means operable to couple the motor when rotating in the opposite direction with the brakes to exert brake-applying effort thereon.

25. Automotive mechanism comprising, in combination, an engine, an electric starting motor, brakes, mechanism operable to couple the motor with the engine to start the engine, mechanism operable to couple the motor with the brakes to exert brake-applying effort thereon, an electric circuit including said motor and a source of electric power and two switches, one switch being operable when the other switch is open to make the circuit through the motor to exert brake-applying effort on the brakes and the other switch being operable at any position of the first switch to make the circuit through the motor to start the engine.

26. Automotive mechanism comprising, in combination, an engine, an electric starting motor, brakes, mechanism operable to couple the motor with the engine to start the engine, mechanism operable to couple the motor with the brakes to exert brake-applying effort thereon, an electric circuit including said motor and a source of electric power and two switches, one switch being operable to make the circuit through the motor to start the engine, and the other switch being operable to make the circuit through the motor to exert brake-applying effort on the brakes and pedal control mechanism operable to couple the brakes with the motor to receive brake-applying effort therefrom.

27. Automotive mechanism comprising, in combination, an engine, an electric starting motor, brakes, means operable to couple the motor with the engine, means operable to couple the motor with the brakes, a manually operable member controlling said last named means; an electric circuit including said motor, a source of power, and two independently operable switches one of such switches being operable to make the circuit through the motor to start the engine and the other switch being operable to make the circuit through the motor to exert brake-applying effort on the brakes.

28. Automotive brake mechanism comprising, in combination, brakes, a brake shaft coupled therewith to apply the brakes, a power driven torque member mounted on the shaft and coupled therewith through a spring clutch to exert brake-applying effort thereon upon rotation of said member and adapted to permit rotation of the shaft independently of said member and means operable to rotate the shaft independently of said member.

29. Automotive brake mechanism comprising, in combination, brakes, a brake shaft coupled therewith to exert brake-applying effort thereon, a power driven torque member mounted on the shaft, a spring clutch coupling the torque member with the shaft whereby it may exert rotative effort thereon upon rotation of said torque member but is adapted to permit rotation of the shaft independently of the torque member, power means coupled with the torque member to rotate the same, a control for said power means, and means operable to rotate the shaft independently of said torque member.

30. Automotive mechanism comprising, in combination, an internal combustion engine, a motor, brakes, means depending upon the direction of rotation of the motor for selectively and at will forming operative connections between the motor and either the engine or the brakes, and means for controlling the direction of motor rotation.

31. Automotive mechanism comprising, in combination, an internal combustion engine, a motor, brakes, means operable on rotation of the motor in one direction to crank the engine, means operable on rotation of the motor in the opposite direction to apply the brakes, said last named means including a frictional spring clutch connection.

32. Automotive mechanism comprising, in combination, an internal combustion engine, a motor, a brake applying shaft, means for selectively rotating said motor in either direction, means whereby rotation in one direction couples said motor with said engine to crank the same, and means including a manually operable brake pedal whereby rotation in the other couples said motor with said brakes.

33. In combination with automotive mechanism including a brake actuating shaft, a booster mechanism, and a manually operable brake applying member, expansible friction clutch mechanism for coupling the booster with the brake actuating shaft, means for expanding the friction clutch on movement of the brake applying member, adjustable means for limiting such expansion, and means including the expanding member of said clutch for mechanically coupling said actuating shaft and brake applying member independently of the booster mechanism.

In testimony whereof, I, VINCENT G. APPLE, sign this specification.

VINCENT G. APPLE.